United States Patent [19]

Alfille et al.

[11] Patent Number: 4,734,557

[45] Date of Patent: Mar. 29, 1988

[54] DEFORMABLE MIRROR

[76] Inventors: Jean-Pascal Alfille, 1 Allée du Nivernais, 92140 Clamart; Jean-Paul Noel, 22 bis rue des Gillons, Chatenay-Malabry 92290, both of France

[21] Appl. No.: 883,591

[22] Filed: Jul. 9, 1986

[30] Foreign Application Priority Data

Jul. 10, 1985 [FR] France ............................. 85 10578

[51] Int. Cl.<sup>4</sup> ............................................ B23K 26/06
[52] U.S. Cl. .................... 219/121 LQ; 216/121 LX; 350/608; 350/610; 350/611
[58] Field of Search ............... 219/121 LP, 121 LQ, 219/121 LX; 350/608, 610, 611, 623, 624, 628, 620, 618, 619

[56] References Cited

U.S. PATENT DOCUMENTS

| 3,254,342 | 5/1966 | Miller | 343/781 |
| 3,514,776 | 5/1970 | Mulready | 219/121 LQ |
| 4,043,644 | 8/1978 | Humphrey | 350/295 |
| 4,046,462 | 9/1977 | Fletcher et al. | 350/608 |
| 4,119,366 | 10/1978 | Lemaitre | 350/295 |
| 4,239,343 | 12/1980 | Wrench | 350/295 |
| 4,266,857 | 5/1981 | Svenson | 350/295 |
| 4,271,347 | 6/1981 | Svenson | 219/121 LQ |
| 4,288,146 | 9/1981 | Johnson, Jr. et al. | 350/295 |

FOREIGN PATENT DOCUMENTS 3119823 12/1982 Fed. Rep. of Germany ...... 350/611

*Primary Examiner*—C. L. Albritton

[57] ABSTRACT

A thin reflecting disk tightly bears on one edge of a case for defining a closed volume, means being provided in the latter for producing a negative pressure, and the bottom of the case is provided with supports arranged in parallel rows of three supoprts, a small beam being advantageously interposed between the disk and each row of supports when this mirror is used for focusing a laser beam, it is possible, by simply regulating the supports, to modify the shape of the disk so as to, e.g. obtain a rectilinear focal zone and a constant energy concentration of the beam along the zone.

5 Claims, 7 Drawing Figures

DEFORMABLE MIRROR

BACKGROUND OF THE INVENTION

The present invention relates to a deformable mirror. It is more particularly used as an element of the optical system of a laser beam focusing head.

When power lasers ($CO_2$, YAG...) are, e.g. used for heat treatment or machining purposes, the incident laser beam is focused onto the material to be treated or machined by a focusing head diagrammatically shown at 1 in FIG. 1. The laser beam 2 is firstly reflected by a reflecting mirror 4, e.g. cooled by water, towards a focusing mirror 6. The function of the latter is to focus the laser beam 2 at a given focal distance onto the target material 8, in accordance with a focal spot and energy distribution which vary according to uses.

For example, in heat treatment, it is of interest to focus the laser beam according to a straight segment and with a constant energy distribution.

To meet with all these possible uses, the operator has to have a range of conventional convergent optics, as well as special optics for modifying the energy distribution. Thus, there is a disturbing and costly lack of flexibility when a wide laser use range is required.

The invention relates to a focusing mirror, whose reflecting surface is deformable. Hitherto deformable mirrors have been of three main types. The first has a reflecting surface formed by a disk bearing on an O-ring and subject to a negative pressure (cf,. e.g. U.S. Pat. No. 4,119,366). This leads to a mirror having a concavity which is difficult to control and which is difficult to stabilize. Moreover, it is virtually impossible to obtain a counter-curvature of the mirror.

The second type of deformable mirror (cf,. e.g. German Pat. No. 3119823) has punctiform actuators fixed to a reflecting disk so as to draw on the same and form fixed or elastic supports permitting the local modification of the shape of the mirror. With such a system it is difficult to have a regular curvature without breaks in the surface because the supports are located and fixed in rigid manner to the disk, which introduces supplementary stresses into the latter. This is even more so when it is a question of obtaining a surface not symmetrical of revolution, e.g. when using the laser in heat treatment.

The third type of deformable mirror has a reflecting surface whose shape is determined by twisting torques (cf,. e.g. U.S. Pat. No. 4,043,644). This solution makes it possible to obtain a regular curvature of the surface in the case when the latter is cylindrical. When said surface is of a random nature, the settings are very difficult to control and the shape obtained is not very stable.

SUMMARY OF THE INVENTION

The invention relates to a deformable mirror making it possible to obviate the aforementioned disadvantages. For this purpose, the mirror according to the invention and formed by a thin reflecting disk bearing tightly on one edge of a case for defining a closed volume, means being provided therein for producing a negative pressure, is characterized in that the case is provided with regulatable supports making it possible to control the curvature of the disk, said curvature resulting from the combined action of the negative pressure and the regulatable supports.

Advantageously, said supports are aligned in parallel rows of at least three supports in accordance with a given direction, a deformable small beam or girder being interposed between the disk and each row of supports.

More specifically, when the mirror according to the invention is used in a laser installation focusing head, the supports are regulated in such a way that the disk has a circular curvature along each of the beams and along said given direction making it possible to obtain a rectilinear focal zone and in a direction perpendicular to said direction, the supports are regulated in such a way that the disk has locally at least one counter-curvature making it possible to redistribute the energy concentration of a laser beam emitted by a laser source and focused by the mirror.

Appropriately, said counter-curvature is located in the center of the disk and the energy concentration redistributed by the deformable mirror is constant.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
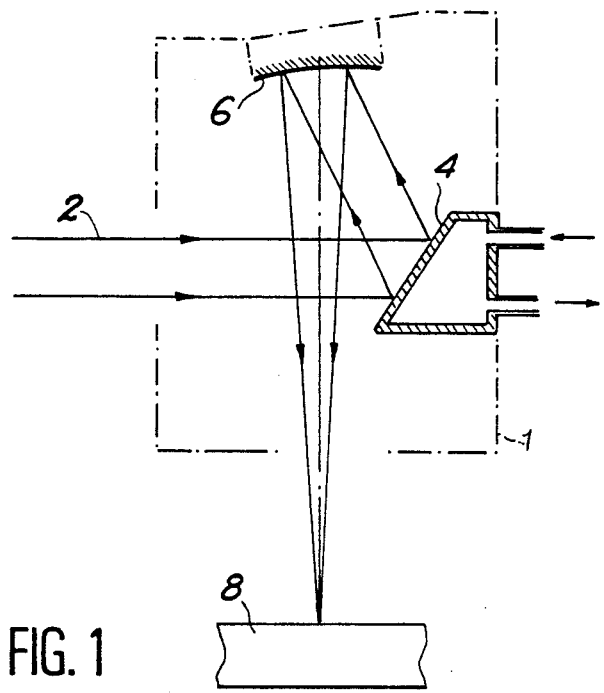
FIG. 1: Already described, diagrammatically a laser beam focusing head.
Figure 4:
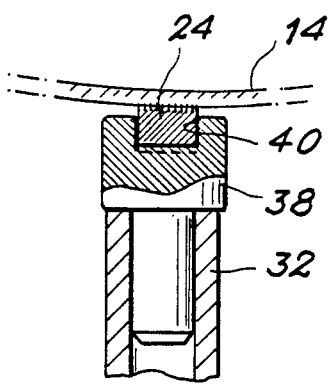
FIG. 4: In section, the connection between a beam and a regulatable support.
Figure 2:
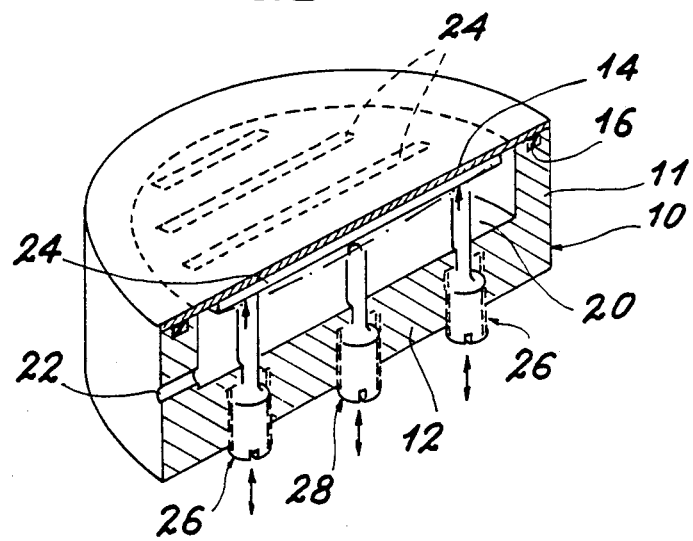
FIG. 2: In perspective and longitudinal sectional form, an embodiment of the mirror according to the invention.
Figure 3:
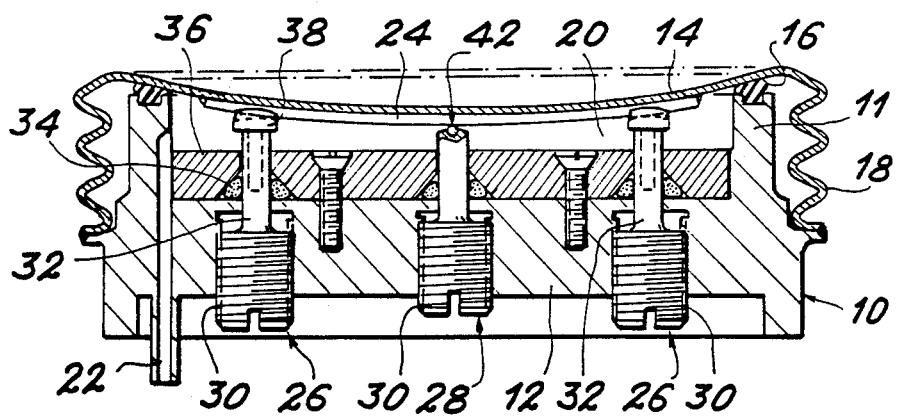
FIG. 3: In longitudinal sectional form, the mirror according to the invention and more specifically a beam and its three regulatable supports.

An embodiment of the deformable mirror according to the invention is shown in FIGS. 2, 3 and 4. The mirror comprises a case 10 having a cylindrical circular wall 11 and a flat bottom 12.

A circular reflecting disk 14 is applied to the edge of wall 11 facing bottom 12 via an O-ring 16. Thus, a tight space 20 is formed between disk 14 and case 12. A bellows 18 extends disk 14 so as to surround case 10 and join disk 14 to case 10 when no negative pressure is produced in the space 20.

An opening 22 formed in case 10 makes it possible to connect said space 20 e.g. to a vacuum pump. When a negative pressure is applied to space 20, disk 14 forms in accordance with a paraboloid of revolution, as best seen in FIG. 3. The mirror then behaves like a conventional convergent revolution mirror.

Figure 5:
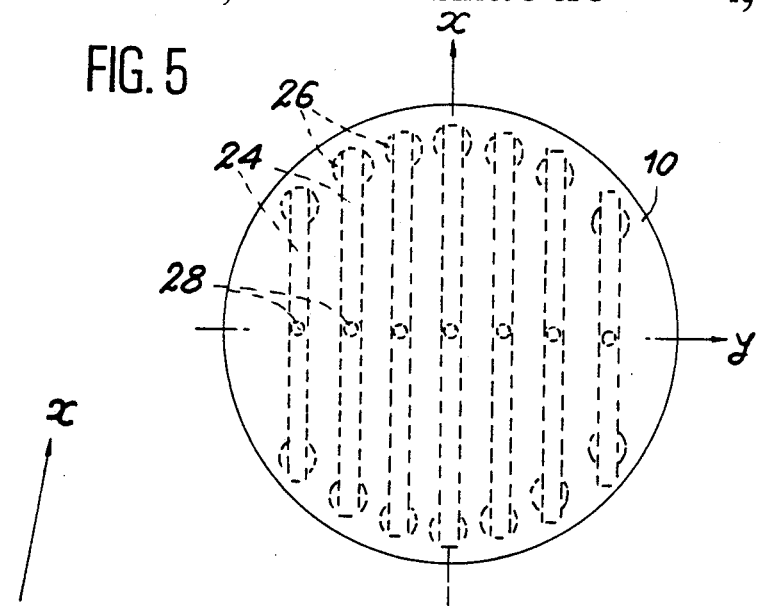
FIG. 5: A plan view of the mirror according to the invention.

To obtain multiple focusings, e.g. in accordance with a straight segment, parallel, height-regulatable small beams or girders 24 are applied to the back of the reflecting disk 14. These e.g. seven elastic beams 24 are parallel and arranged symmetrically with respect to an axis Ox of the mirror (cf. FIG. 5).

Each of these beams 24 is deformed under the action of three regulatable supports, two supports 26 at the ends of the beam 24 and one central support 28 in the center thereof. These supports 26, 28 are constituted by screws 30 located in threads formed in the bottom 12 of case 10. Each of these screws is extended by a rod 32. A joint 34 surrounds each rod 32 and is applied against the bottom 12 by a flange 36, which is itself fixed against bottom 12, so that the sealing of space 20 is maintained.

As shown in FIG. 4, the rods 32 of supports 26, 28 are provided at their free end with bores in which are slidingly located heads 38, in which are formed grooves 40 for slidingly receiving the corresponding beams 24. An elastic glue deposited between each groove 40 of head 38 and the corresponding beam 24 elastically maintains the latter in place. Thus, no torsional stress is applied to the beams by supports 26, 28.

The rod 32 of central support 28 is provided at its free end with a ball 42, which is directly applied to the corresponding beam 24. By acting on the settings of the three supports 26, 28 of a beam 24, it is possible in this way to obtain a controlled curvature of the reflecting disk 14. The beams make it possible to distribute stresses due to the supports 26, 28 and thus advantageously obtain a harmonious curvature of the disk without any disturbing breaks.

Figure 7:
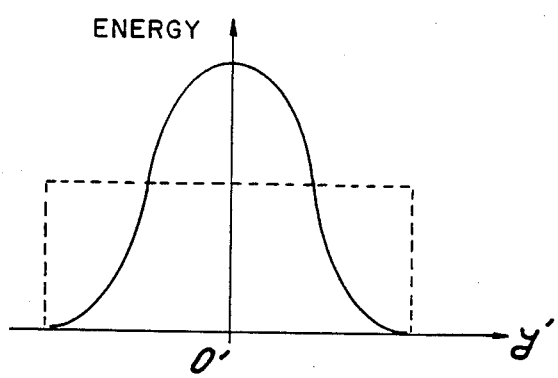
FIG. 7: A graph with, on, the abscissa the distance of a point with respect to the axis of the laser beam and, on the ordinate, the energy of said beam.

In general terms, on emission, the laser beam has a Gaussian distribution of its energy, as shown by the continuous line curve of FIG. 7. However, e.g. for heat treatments, it is of interest to have a constant distribution of the beam energy, as shown by the broken line curve of FIG. 7. The mirror according to the invention is highly advantageous for obtaining such an energy distribution.

Figure 6:
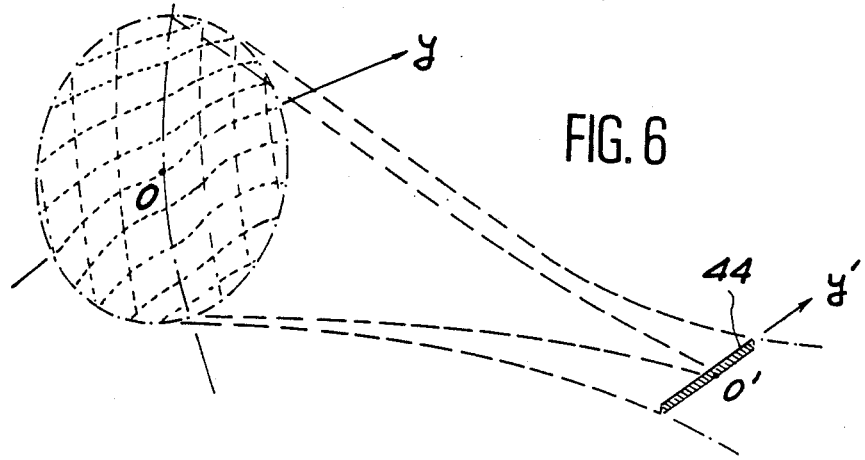
FIG. 6: Diagrammatically, the mirror level curves according to the invention, when the focal spot is a straight segment and the energy distribution constant.

Thus, as is diagrammatically shown by the level curves of FIG. 6, supports 26, 28 are then regulated in such a way that the reflecting disk 14 has a circular curvature along each of the beams 24, i.e. along Ox, making it possible to obtain a rectilinear focal zone 44. In a direction Oy perpendicular to Ox, the supports are regulated in such a way that disk 14 locally has a counter-curvature in its center making it possible to obtain a constant energy distribution of the laser beam focused by the mirror.

In order to regulate such a mirror, it is necessary to use a rational procedure. Thus, the focal distance, dimensions of the focal spot and the energy distribution are interdependent, so that it is necessary to regulate these parameters by successive loop-type adjustments until the desired result is obtained.

Obviously, the above description has only been given in an exemplified manner; all modifications in the embodiments can be envisaged without modifying the basic principle of the invention. For example, the number of beams and supports depends on the size of the mirror and the shape thereof, which can be random. The number of supports can also be determined by the desired shape of the disk along a beam, e.g. when several counter-curvatures are required.

What is claimed is:

1. A deformable mirror comprising a thin reflecting disk tightly bearing on an edge of a case for defining a closed volume, means being provided in said closed volume for producing a negative pressure to deform said disk, wherein the case is provided with regulatable supports which exert substantially no pulling forces on the disk and are adjustable toward and away from the disk to set limits to which the disk can be deformed by the negative pressure.

2. A laser installation having a laser beam emitting source and a focusing head provided with a deformable mirror focusing said laser beam, said mirror being deformed by a thin reflecting disk tightly bearing on an edge of a case for defining a closed volume, means being provided in said closed volume for producing a negative pressure, wherein the case is provided with regulatable supports making it possible to control the curvature of the disk, said curvature resulting form the combined action of the negative pressure and the regulatable supports, said supports being aligned in parallel rows of at least three supports in a given direction, a deformable beam being interposed between the disk and each row of supports, and the supports being regulated in such a way that the disk has a circular curvature along each of the beams and in said direction, making it possible to obtain a rectilinear focal zone and, in a direction perpendicular to said direction, the supports being regulated in such a way that the disk locally has at least one counter-curvature making it possible to redistribute the energy concentration of the laser beam focused by the mirror.

3. A laser installation according to claim 2, wherein the counter-curvature is located in the center of the disk for a Gaussian distribution beam and wherein the energy concentration redistributed by the deformable mirror is constant.

4. A laser installation having a laser beam emitting source and a focusing head equipped with a deformable mirror as defined in claim 1 to focus said laser beam, wherein the supports are adjusted so that the mirror has a circular curvature in a given direction making it possible to obtain a rectilinear focal zone and has in the direction perpendicular to said direction a counter-curvature making it possible to redistribute the energy concentration of the laser beam focused by the mirror.

5. A deformable mirror deformed by a thin reflecting disk tightly bearing on an edge of a case for defining a closed volume, means being provided in said closed volume for producing a negative pressure, wherein the case is provided with regulatable supports making it possible to control the curvature of the disk, said curvature resulting from the combined action of the negative pressure and the regulatable supports, said supports being aligned in parallel rows of at least three supports in a given direction, a deformable beam being interposed between the disk and each row of supports.

* * * * *